(12) United States Patent
Miedema

(10) Patent No.: US 11,303,541 B2
(45) Date of Patent: Apr. 12, 2022

(54) SYSTEMS AND METHODS FOR TRANSACTION MODELS AND DECLARATION CONFIGURATION IN A DISTRIBUTED ARCHITECTURE

(71) Applicant: Ciena Corporation, Hanover, MD (US)

(72) Inventor: David Miedema, Ottawa (CA)

(73) Assignee: Ciena Corporation, Hanover, MD (US)

( * ) Notice: Subject to any disclaimer, the term of this patent is extended or adjusted under 35 U.S.C. 154(b) by 9 days.

(21) Appl. No.: 16/267,533

(22) Filed: Feb. 5, 2019

(65) Prior Publication Data

US 2020/0252307 A1    Aug. 6, 2020

(51) Int. Cl.
*H04L 41/5054* (2022.01)
*H04L 41/5041* (2022.01)
*H04L 67/01* (2022.01)
*H04L 41/0813* (2022.01)
*H04L 41/0806* (2022.01)

(52) U.S. Cl.
CPC ...... *H04L 41/5054* (2013.01); *H04L 41/0806* (2013.01); *H04L 41/0813* (2013.01); *H04L 41/5048* (2013.01); *H04L 67/42* (2013.01)

(58) Field of Classification Search
CPC ............. H04L 67/2809; H04L 67/2838; H04L 67/2814; H04L 67/2871; H04L 41/5054; H04L 41/0806; H04L 41/0813; H04L 41/5048; H04L 67/42; G06Q 10/10; G06F 9/5061; G06F 9/5066; G06F 9/5072; G06F 9/5077
See application file for complete search history.

(56) References Cited

U.S. PATENT DOCUMENTS

| | | | |
|---|---|---|---|
| 7,765,283 B2 * | 7/2010 | Noy | H04L 41/08 709/220 |
| 8,515,799 B2 * | 8/2013 | Keller | G06F 9/5038 705/7.27 |
| 8,667,138 B2 * | 3/2014 | Ganesan | G06F 9/5072 709/226 |
| 10,735,281 B1 * | 8/2020 | Burgin | H04L 41/5038 |
| 2004/0054690 A1 | 3/2004 | Hillerbrand et al. | |
| 2004/0220946 A1 | 11/2004 | Krishnaprasad et al. | |
| 2005/0044252 A1 * | 2/2005 | Floyd | H04L 45/7453 709/230 |
| 2008/0133587 A1 | 6/2008 | Ganugapati et al. | |
| 2008/0240119 A1 * | 10/2008 | Wylie | H04L 43/0876 370/400 |
| 2010/0083277 A1 | 4/2010 | Malladi et al. | |
| 2011/0138168 A1 | 6/2011 | Peterson et al. | |
| 2013/0117326 A1 | 5/2013 | De Smet et al. | |

(Continued)

*Primary Examiner* — Jonathan A Bui
*Assistant Examiner* — Zonghua Du
(74) *Attorney, Agent, or Firm* — Clements Bernard Baratta; Lawrence A. Baratta, Jr.; Christopher L. Bernard

(57) ABSTRACT

Systems and methods include receiving a provisioning request for a service in a distributed system; staging the provisioning request to one or more additional services in the distributed system; receiving a staging response from the one or more additional services that provides additional provisioning for the one or more additional services based on the provisioning request; and providing an amended provisioning request for the service and the one or more additional services that includes the provisioning request and the additional provisioning.

18 Claims, 6 Drawing Sheets

(56) References Cited

U.S. PATENT DOCUMENTS

| | | | |
|---|---|---|---|
| 2015/0120889 A1* | 4/2015 | Sapaliga | H04L 41/0853 |
| | | | 709/221 |
| 2016/0124742 A1* | 5/2016 | Rangasamy | H04L 41/0803 |
| | | | 717/103 |
| 2017/0272360 A1 | 9/2017 | Dunn et al. | |
| 2018/0084063 A1 | 3/2018 | Miedema | |
| 2020/0007418 A1* | 1/2020 | Greenstein | H04L 41/5054 |
| 2020/0084288 A1* | 3/2020 | Baig | H04L 67/2833 |

* cited by examiner

SYSTEMS AND METHODS FOR TRANSACTION MODELS AND DECLARATION CONFIGURATION IN A DISTRIBUTED ARCHITECTURE

FIELD OF THE DISCLOSURE

The present disclosure generally relates to software operation of services in a distributed system. More particularly, the present disclosure relates to systems and methods for transaction models and declaration configuration in a distributed architecture.

BACKGROUND OF THE DISCLOSURE

A Service-Oriented Architecture (SOA) is an approach in computer software design in which application components provide services to other components via a communications protocol such as over a network. The principles of service-orientation are independent of any vendor, product, or technology. A service is a self-contained unit of functionality and services can be combined to provide the functionality of a large software application. Every computer can run any number of services, and each service is built in a way that ensures that the service can exchange information with any other service in the network without human interaction and without the need to make changes to the underlying program itself. Microservices are a variant of SOA used to build distributed software systems. Similar to SOA, services in a Microservice Architecture (MSA) are processes that communicate with each other over the network in order to fulfill an objective, and these services use technology-agnostic protocols. In a Microservice Architecture, services should be small, and the protocols should be lightweight. The benefit of distributing different responsibilities of the system into different smaller services is that it enhances the cohesion and decreases the coupling. This makes it much easier to change and add functions and qualities to the system anytime. One example of a distributed system that uses services is a network element in a telecommunications network, e.g., an optical network element, router, switch, etc.

Related to provisioning in a distributed system, conventional approaches for provisioning require that services need to consequent provisioning must specifically code the logic and dependent services must listen for configuration changes and then proceed with the additional provisioning. This opens up the possibility of database inconsistency in the distributed system because the original transaction cannot be rolled back once committed. Conventional approaches for performing declarative configuration require that a configurator know all the dependent and consequent provisioning related to an action. This typically duplicates domain-specific knowledge. This knowledge duplication may be incorrect, incomplete, or difficult to implement at this location in the distributed system.

Accordingly, shortcomings of current distributed systems, such as in a network element, include database inconsistencies, inefficiencies when proceeding with consequent actions and cascading consequent actions related to configuration and provisioning, and duplication of domain-specific logic that follows from the desired configuration request.

BRIEF SUMMARY OF THE DISCLOSURE

In an embodiment, a method includes receiving a provisioning request for a service in a distributed system; staging the provisioning request to one or more additional services in the distributed system; receiving a staging response from the one or more additional services that provides additional provisioning for the one or more additional services based on the provisioning request; and providing an amended provisioning request for the service and the one or more additional services that includes the provisioning request and the additional provisioning. The method can further include utilizing the amended provisioning request instead of the provisioning request such that the service is provisioned concurrently with the additional provisioning for the one or more additional services. The staging can be performed iteratively and recursively. The staging can utilize a plurality of stagers each associated with components of the distributed system, and wherein the staging can include proceeding for the components until there are no more stagers to be invoked or all invoked stagers report no additional data for the additional provisioning. The distributed system can include external components that are modeled by an external model and internal components that are modeled by an internal model, and wherein validation code for the provisioning request is not replicated in each of the external model and the internal model.

Responsive to an internal service making an internal change to an internal configuration that would also change an external model, the staging can include determining the change to the external model associated with the internal change such that validation is performed for both the internal service and the external model. The method can further include utilizing the amended provisioning request to form an entire transaction that is validated in advance of committing. The method can further include subsequent to the staging, identifying errors in the one or more additional services prior to committing the provisioning request; and preventing the provisioning request responsive to the errors. The distributed system can be a network element having a plurality of modules.

In another embodiment, a distributed system includes a plurality of hardware modules; and a plurality of services executed on one or more of the plurality of hardware modules, wherein a service of the plurality of services is configured to receive a provisioning request, stage the provisioning request to one or more additional services of the plurality of services, receive a staging response from the one or more additional services that provides additional provisioning for the one or more additional services based on the provisioning request, and provide an amended provisioning request for the service and the one or more additional services that includes the provisioning request and the additional provisioning. The service can be further configured to utilize the amended provisioning request instead of the provisioning request such that the service is provisioned concurrently with the additional provisioning for the one or more additional services. The provisioning request can be staged iteratively and recursively. The provisioning request can be staged via a plurality of stagers each associated with components of the distributed system, and wherein the provisioning request can be staged via proceeding for the components until there are no more stagers to be invoked or all invoked stagers report no additional data for the additional provisioning.

The distributed system can include external components that are modeled by an external model and internal components that are modeled by an internal model, and wherein validation code for the provisioning request is not replicated in each of the external model and the internal model. Responsive to an internal service making an internal change to an internal configuration that would also change an external model, the staging can include determining the change to the external model associated with the internal change such that validation is performed for both the internal service and the external model. The service can be further configured to utilize the amended provisioning request to form an entire transaction that is validated in advance of committing. The service can be further configured to subsequent to the staging, identify errors in the one or more additional services prior to committing the provisioning request, and prevent the provisioning request responsive to the errors. The distributed system can be a network element.

In a further embodiment, a non-transitory computer-readable medium includes instructions that, when executed, cause a processor to perform the steps of receiving a provisioning request for a service in a distributed system; staging the provisioning request to one or more additional services in the distributed system; receiving a staging response from the one or more additional services that provides additional provisioning for the one or more additional services based on the provisioning request; and providing an amended provisioning request for the service and the one or more additional services that includes the provisioning request and the additional provisioning. The instructions that, when executed, can further cause the processor to perform the step of utilizing the amended provisioning request instead of the provisioning request such that the service is provisioned concurrently with the additional provisioning for the one or more additional services.

BRIEF DESCRIPTION OF THE DRAWINGS

The present disclosure is illustrated and described herein with reference to the various drawings, in which like reference numbers are used to denote like system components/ method steps, as appropriate, and in which:

FIG. 7 is a block diagram of a processing device for the node of FIG. 6 or the like.

DETAILED DESCRIPTION OF THE DISCLOSURE

Figure 1:
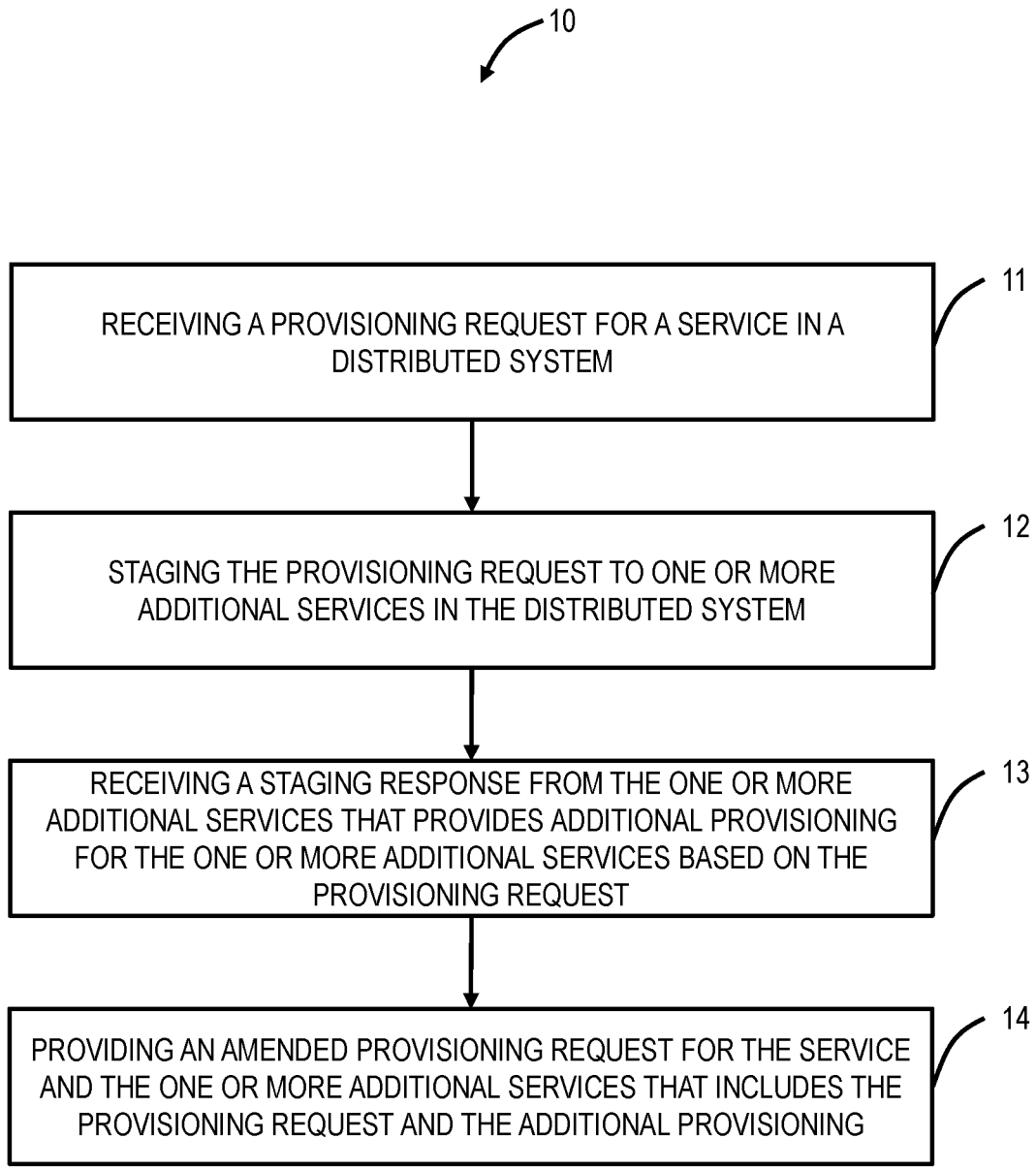
FIG. 1 is a flowchart of a staging process for a provisioning request in a distributed system.

The present disclosure relates to systems and methods for transaction models and a declaration configuration in a distributed architecture, such as a network element operating in a network. For example, a network element has many services operating together in a distributed architecture, i.e., the network element is a distributed system. In operation, network elements require provisioning such as via an operator, a Network Management System (NMS), a control plane, a Software Defined Networking (SDN) controller, etc. To rectify the aforementioned limitations related to provisioning in a distributed system, the systems and methods expose consequent actions of a provisioning request in a new way that can be used by template expansions, resource translators, and declarative clients to ensure consistency across distributed services and databases in a distributed system.

The following provides definitions of some of the key terms utilized herein

| | |
|---|---|
| Transaction model | A transaction model is one in which a set of configuration data can be edited atomically in one transaction. Either the whole transaction works, or it does not. |
| Declaration configuration | A declarative or declared config is one in which the entire database is supplied as a "replace" operation every time. |
| Template expansions | A template expansion is the ability for the system to add additional data to a transaction when an edit operation is performed. The template is typically a set of static data applied when something is provisioned. |
| Resource translators | A resource translator is a service that can translate protocols or models for other services. A resource translator could translate from a Command Line Interface (CLI) command to a Netconf edit-config operation in the same model, or could translate from a CLI command in one model to a set of other CLI commands internal to the system in a different model. |
| Declarative clients | A declarative client is a client who provisions servers using declarative config. |
| Distributed system | In our example, a network element which has multiple services which operate together. However, this can be any type of system with multiple services. |
| Provisioning request | The configuration of a service which can impact other services in a distributed system, e.g., provisioning a port on a line module can impact a switch module, other line modules, etc. |

Transactions between services in a distributed system, e.g., a network element, are difficult to implement since each service owns its own data. In many cases, provisioning a configuration request in one service invokes consequent provisioning in other services. For example, with respect to a network element, provisioning or configuring a port on one line module can have consequent provisioning or configuring aspects related to other devices such as a switch module, a port on another line module, etc. When services are loosely coupled, this may be sufficient, and a transactional model is not needed. When services desire a more formal level of consistency and validation, a single authoritative transaction may be desired to enforce consistency. Validation and committing of such an authoritative transaction now needs to be done across multiple services and should include all the consequent provisioning the system would normally do.

The systems and methods propose a mechanism by which consequent provisioning is prohibited to occur post-transaction commit after the authoritative transaction. All consequent provisioning actions are performed in a staging operation before the authoritative transaction is validated. This staging allows additional internal provisioning based on an external request, additional external provisioning based on an external request, and recursive staging operations that proceed through a hierarchy of services. In addition, this staging operation can be invoked externally prior to a declarative configuration request.

In a system that supports configuration using a declarative configuration, the entire configuration is provided every time a change is requested. It is the responsibility of the service to detect changes to the configuration, perform validation, and apply the changes. Since a declarative configuration model dictates that the entire provisioning operation is specified every time, domain-specific logic on consequent or related provisioning is usually replicated in the client in order to construct the proper configuration. The use of staging as a way to represent all consequent actions that a distributed system would expect to perform as the result of a transaction allows the configuration to be fully expanded and specified before the request is made. This keeps the domain-specific knowledge of the provisioning inside the service that owns the data.

In a distributed system with multiple internal components that will be affected by a configuration change, there is additional data inside the service that needs to be configured to reflect the external configuration. Normally, such internal configuration would have its own validation functions and would be applied after the external configuration had been validated and committed. This can lead to cases where the validation of the external configuration should have been rejected due to validation rules of the consequent actions, but because the configuration is applied in multiple transactions, the entire configuration change (external and internal) could not be evaluated and rejected as a whole.

In a distributed system in which automatic provisioning occurs to help simplify an external configuration, a small change requested externally can be converted into a set of other consequent internal provisioning that follows from the initial provisioning. For example, creating a database record for a new user may also create a user profile and a set of default records in various other systems, both internal and external. In a declarative model, it is a requirement that the entire configuration is specified in every provisioning operation. In these cases, services are not permitted to apply consequent external provisioning occurs due to a simple external change since the entire external config needs to be supplied. However, it may be very difficult and undesirable to have the external controller understand and replicate the logic associated with this consequent provisioning, especially if the consequences are not static but can vary with system conditions.

In both cases, it is desirable to provide an additional step to a configuration operation that allows consequent provisioning (both internal and external) to be queried as the result of a request configuration change. This staging operation can be invoked implicitly in the configuration operation for internal staging and can be explicitly invoked before the configuration operation for external staging.

Staging Process

FIG. 1 is a flowchart of a staging process 10. The staging process 10 operates in a distributed system, such as a network element or the like. The staging process 10 includes receiving a provisioning request for a service in a distributed system (step 11); staging the provisioning request to one or more additional services in the distributed system (step 12); receiving a staging response from the one or more additional services that provides additional provisioning for the one or more additional services based on the provisioning request (step 13); and providing an amended provisioning request for the service and the one or more additional services that includes the provisioning request and the additional provisioning (step 14). The staging process 10 can further include utilizing the amended provisioning request instead of the provisioning request such that the service is provisioned concurrently with the additional provisioning for the one or more additional services.

The staging process 10 allows the imposition of a condition that committing a validated configuration operation cannot have consequent actions that are applied after the initial commit it done. That is, the staging process 10 allows for all consequent actions to be validated and applied in the same transaction. The staging process 10 can be applied iteratively and recursively as part of a transaction. For instance, a small change in configuration may result in staged data added to the transaction, and this new staged data can also be processed by additional stagers to expand on the newly provided configuration data. This can proceed for both internal and external components until there are no more stagers to be invoked or all invoked stagers report no additional data to be added to the transaction.

The staging process 10 allows the validation code to exist in one place and not need to be replicated in both the external model and the internal model. That is, the distributed system can include external components that are modeled by an external model and internal components that are modeled by an internal model, and wherein validation code for the provisioning request is not replicated in each of the external model and the internal model. Responsive to an internal service making an internal change to an internal configuration that would also change an external model, the staging process 10 can include determining the change to the external model associated with the internal change such that validation is performed for both the internal service and the external model.

The staging process 10 can also work in the reverse direction for a translator. If an internal service desired to make a change to an internal configuration, but that internal change would have a reflection in the external model (and a validation function associated with it), the stager can determine the external config change associated with an internal change and perform validation on the entire request en masse. This allows consistency to be enforced between config changes on services that are developed and maintained independently from each other.

The use of a stager can provide the ability to have "stacked templates" applied to a config request. For example, provisioning a single record with a key value externally can result in a default template being applied for that record in which defaults can be applied to move the request from an abstract request to a specific request in which all default attributes and objects are provided. However, the initial template staging can apply data that is less abstract but still not completely specified, and subsequent staging operations can then be applied to further specify the details that arise from the intermediate abstract templates. This can all be performed in advance of a declarative config request as well, so a service can provide all relevant details of a simple provisioning operation to a client before the config request is initiated. This allows complex runtime logic to be managed by the service that owns the function and logic and allows the client to avoid having to replicate that logic.

The use of staging can also be applied to cases in which an external model supported by a service is translated to an internal model. This translation is not visible to an external user. A stager can be used to translate external provisioning to the internal representation before the transaction is validated. This allows the validation code to exist in one place and not need to be replicated in both the external model and the internal model. Staging can also work in the reverse direction for a translator. If an internal service desired to make a change to an internal configuration, but that internal change would have a reflection in the external model (and a validation function associated with it), the stager can determine the external config change associated with an internal change and perform validation on the entire request en masse. This allows consistency to be enforced between config changes on services that are developed and maintained independently from each other.

The advantage of staging is that the entire transaction can be constructed and validated before any of the transaction is committed. This can help identify errors before they are committed and need to be rolled back. Without staging, it is permitted to have additional configuration actions triggered as a consequence of the original configuration. If the original transaction conflicts with the consequent provisioning or vice versa, this cannot be detected until after the original transaction is completed, which means the distributed databases can become inconsistent and may need intervention to correct.

The staging process 10 can further include utilizing the amended provisioning request to form an entire transaction that is validated in advance of committing. The staging process 10 can also further include, subsequent to the staging, identifying errors in the one or more additional services prior to committing the provisioning request; and preventing the provisioning request responsive to the errors.

Thus, the staging process 10 integrates consequent actions into ("staging") a transaction, so all side effects are validated and committed as a single change. The staging process 10 performs the staging outside the context of, or prior to a transaction to determine what consequent actions are associated with a configuration change. The staging process 10 can iteratively stage until all participants in a transaction have contributed to the transaction. The staging process 10 allows externally visible configurations to be extended based on a request (template application). The staging process 10 allows internally visible configurations to be applied based on a request (driver translation). The staging process 10 enables a declarative configuration request to be constructed by a client before the request is sent, without duplicating domain-specific logic in which consequent provisioning extends the declared configuration.

Staging Examples

Figure 2:
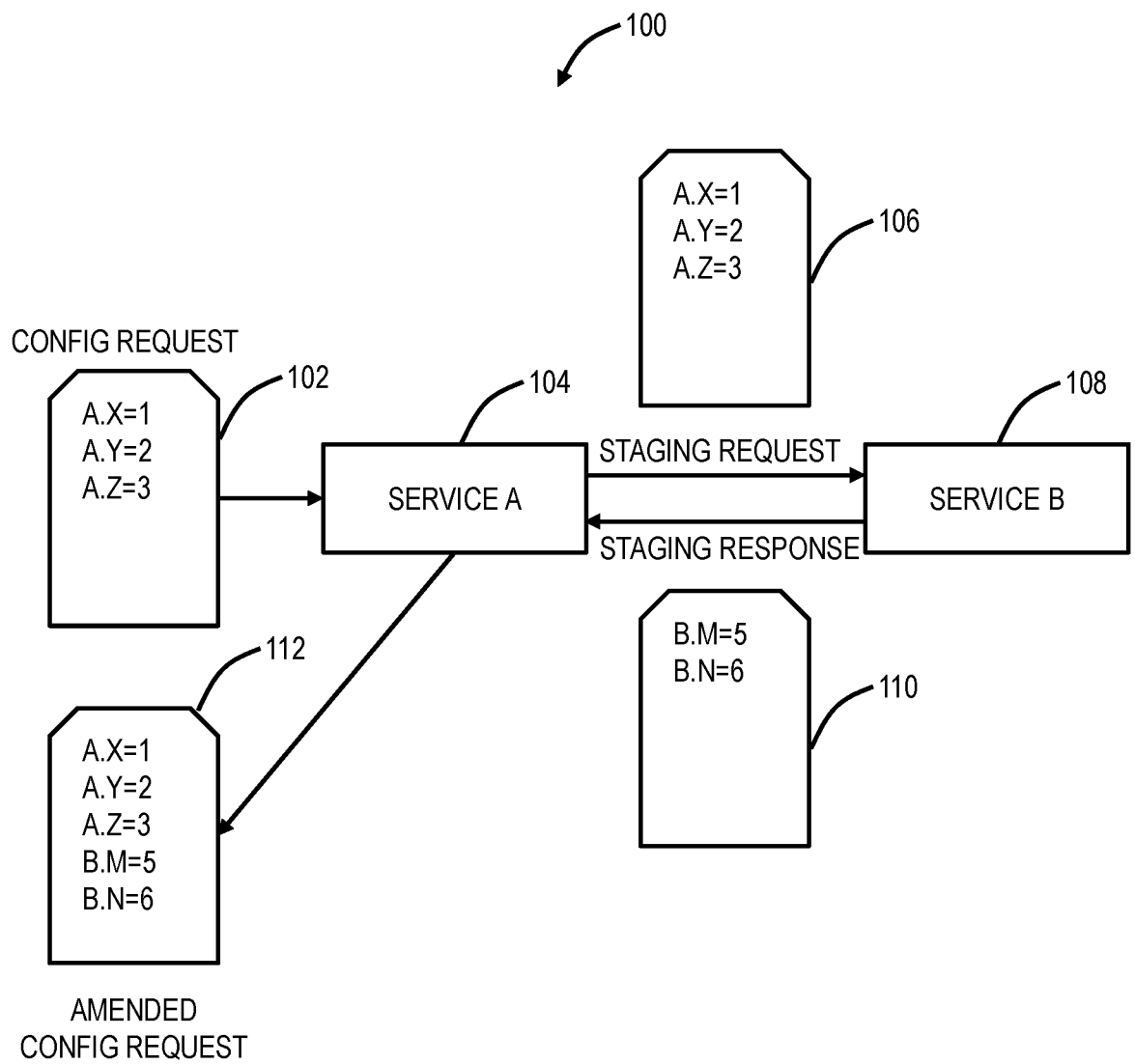
FIG. 2 is a block diagram of a staging example where a provisioning transaction is expanded to include additional internal provisioning that can be validated along with the external provisioning.

FIG. 2 is a block diagram of a staging example 100 where a provisioning transaction 102 is expanded to include additional internal provisioning that can be validated along with the external provisioning. Here, the provisioning transaction 102 is a configuration request for a service A 104, e.g., set A.X=1, A.Y=2, and A.Z=3, for illustration. The staging example 100 implements the staging process 10 and the service A 104 has a stager which forwards a staging request 106 to a service B 108. The staging request 106 includes the configuration request for the service A 104 and the service B 108 analyzes this configuration request and responds with a staging response 110, e.g., B.M=5, B.N=6, for illustration. The staging response 110 reflects configuration changes to the service B 108 based on the provisioning transaction 102 which changes the configuration of the service A 104. The stager returns an amended configuration request 112, set A.X=1, A.Y=2, A.Z=3, B.M=5, B.N=6, which captures the entire transaction.

Figure 3:
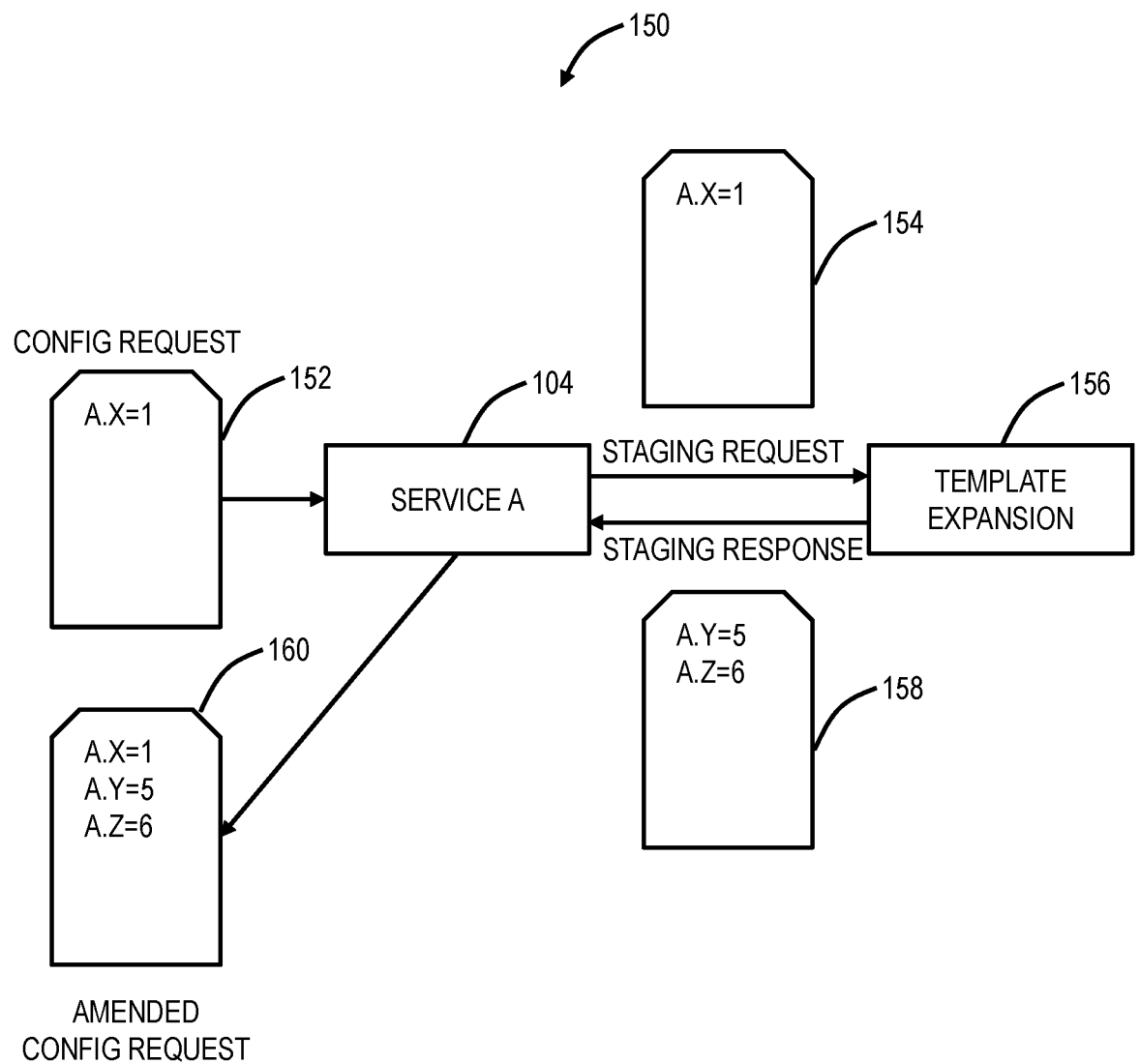
FIG. 3 is a block diagram of a staging example where a provisioning transaction is expanded to include additional external provisioning that can be validated along with the original request.

FIG. 3 is a block diagram of a staging example 150 where a provisioning transaction 152 is expanded to include additional external provisioning that can be validated along with the original request. Here, the provisioning transaction 152 is a configuration request for a service A 104, e.g., set A.X=1, for illustration. The staging example 150 implements the staging process 10 and the service A 104 has a stager which forwards a staging request 154 to a template expansion 156. The template expansion 156 analyzes the staging request 154 to determine any provisioning required externally and provides a staging response 158, e.g., A.Y=5, A.Z=6. The staging response 158 is utilized for an amended configuration request 160, e.g., A.X=1, A.Y=5, A.Z=6.

Figure 4:
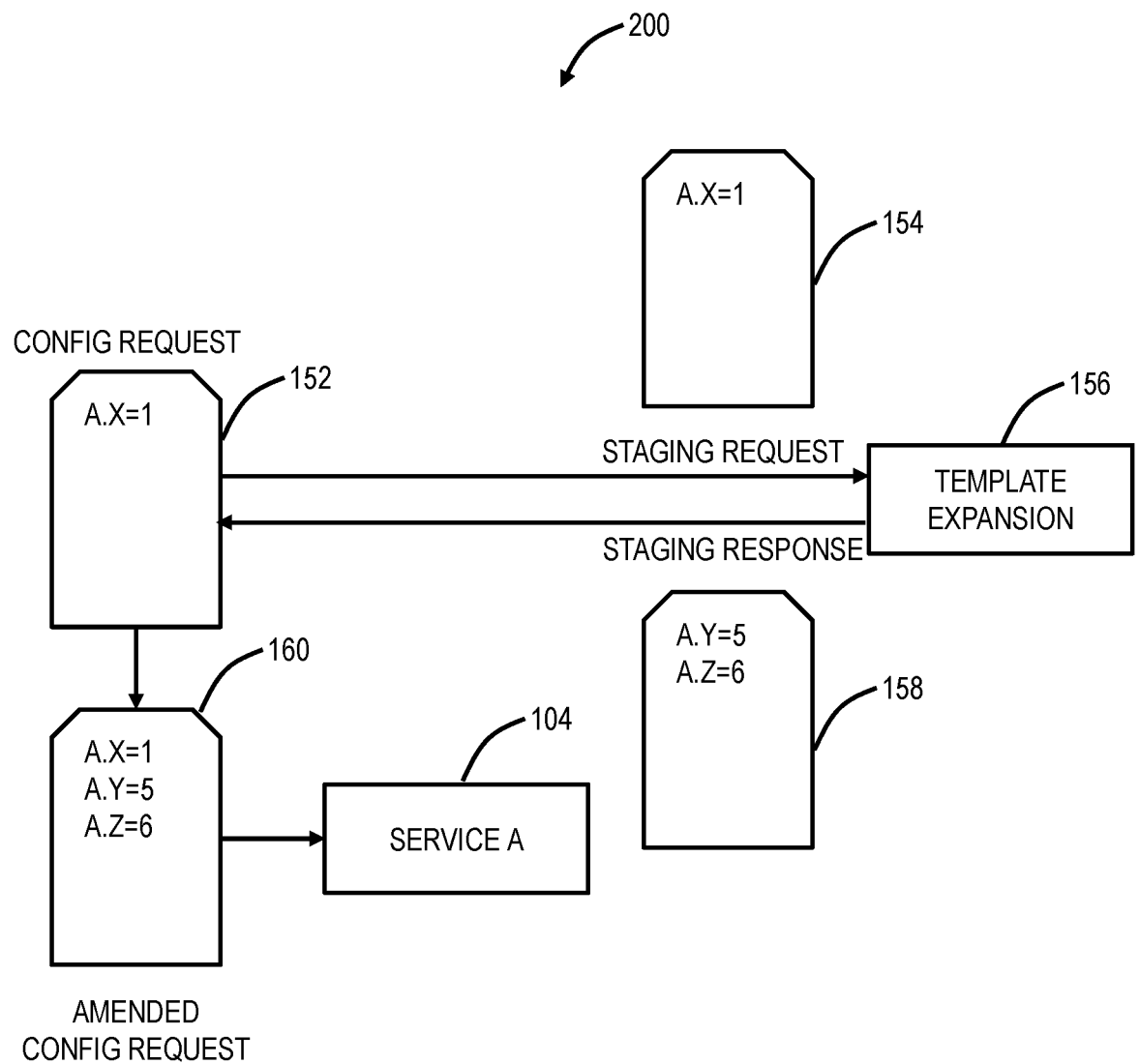
FIG. 4 is a block diagram of staging example where a query is performed to determine what additional provisioning would be applied if a provisioning request is performed.

FIG. 4 is a block diagram of staging example 200 where a query is performed to determine what additional provisioning would be applied if a provisioning request 152 is performed. This enables a declarative config request to be fully created without the domain-specific knowledge needing to be replicated in the client. Here, the provisioning request 152 is provided as a staging request 154 to the template expansion 156. The template expansion 156 responds with the staging response 158, an amended configuration request 160 is determined, and the amended configuration request 160 is provided to the service A 104.

Figure 5:
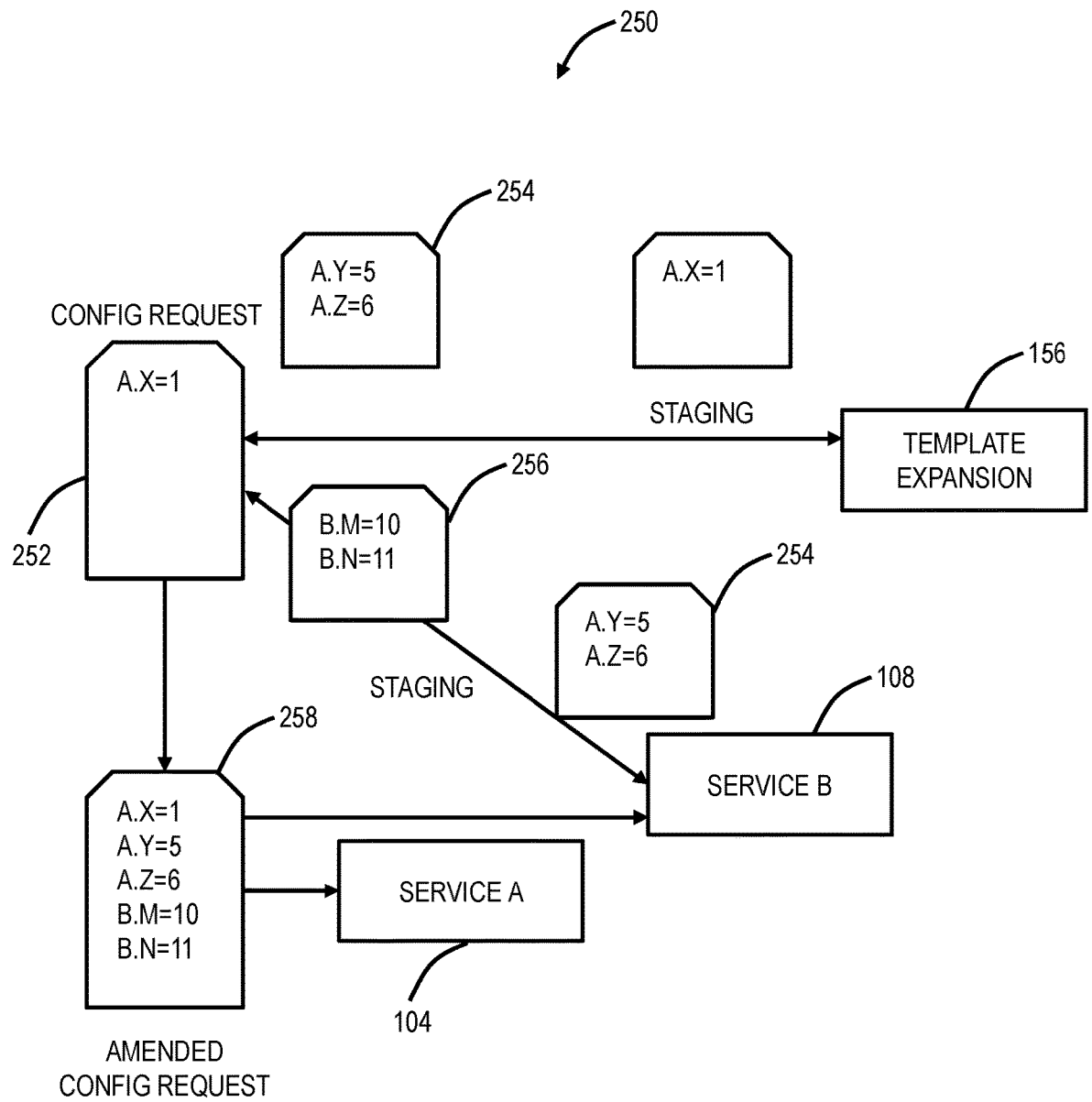
FIG. 5 is a block diagram of staging example where template data is defined in different levels of abstraction and "unfolded" at provisioning time based on the desired configuration.

FIG. 5 is a block diagram of staging example 250 where template data is defined in different levels of abstraction and "unfolded" at provisioning time based on the desired configuration. Here, a configuration request 252 for service A 104 is provided to the template expansion 156 for staging and a response 254 is provided. The response 254 is provided to the service B 108 for staging, and a response 256 is provided. The configuration request 252 and the responses 254, 256 are consolidated into an amended configuration request 258 which can be provided to both the service A 104 and the service B 108.

Example Network Element/Node

Figure 6:
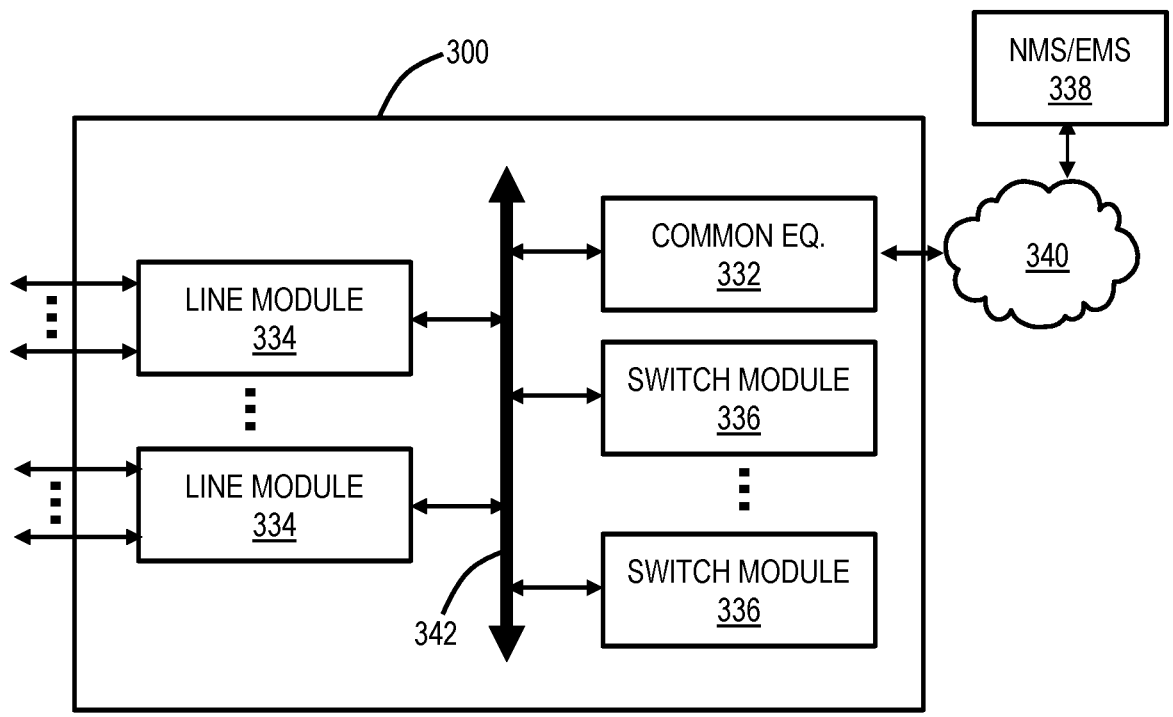
FIG. 6 is a block diagram of a node for use with the systems and methods described herein.

FIG. 6 is a block diagram of a node 300 for use with the systems and methods described herein. Specifically, the node 300 is a distributed optical system which can utilize the staging process 10. In an embodiment, the node 300 can be a network element that may consolidate the functionality of a Multi-Service Provisioning Platform (MSPP), Digital Cross-Connect (DCS), Ethernet and/or Optical Transport Network (OTN) switch, Wave Division Multiplexed (WDM)/Dense WDM (DWDM) platform, Packet Optical Transport System (POTS), etc. into a single, high-capacity intelligent switching system providing Layer 0, 1, 2, and/or 3 consolidation. In another embodiment, the node 300 can be any of an OTN Add/Drop Multiplexer (ADM), a Multi-Service Provisioning Platform (MSPP), a Digital Cross-Connect (DCS), an optical cross-connect, a POTS, an optical switch, a router, a switch, a Wavelength Division Multiplexing (WDM) terminal, an access/aggregation device, etc. That is, the node 300 can be a system with ingress and egress digital and/or optical signals and switching of channels, timeslots, tributary units, etc. Also, the node 300 can be a system with ingress and egress of optical signals and switching/routing of wavelengths. Of course, the node 300 can combine both digital signals and optical signals. While the node 300 is generally shown as an optical network element, the systems and methods contemplated for use with any distributed system.

The node 300 can include common equipment 332, one or more line modules 334, and one or more switch modules 336. The common equipment 332 can include power; a control module; Operations, Administration, Maintenance, and Provisioning (OAM&P) access; user interface ports; and the like. The common equipment 332 can connect to a management system 338 through a data communication network 340. The management system 338 can include a Network Management System (NMS), Element Management System (EMS), or the like. Additionally, the common equipment 332 can include a control plane processor, such as a processing device 350 illustrated in FIG. 7. The node 300 can include an interface 342 for communicatively coupling the common equipment 332, the line modules 334, and the switch modules 336 to one another. For example, the interface 342 can be a backplane, midplane, a bus, optical or electrical connectors, or the like. The line modules 334 are configured to provide ingress and egress to the switch modules 336 and to external connections on the links to/from the node 300. In an embodiment, the line modules 334 can form ingress and egress switches with the switch modules 336 as center stage switches for a three-stage switch, e.g., a three-stage Clos switch. Other configurations and/or architectures are also contemplated.

The line modules 334 can include optical transceivers. Further, the line modules 334 can include a plurality of optical connections per module and each module may include a flexible rate support for any type of connection, such as, for example, 155 Mb/s, 622 Mb/s, 1 Gb/s, 2.5 Gb/s, 10 Gb/s, 40 Gb/s, and 100 Gb/s, N×1.25 Gb/s, and any rate in between as well as future higher rates. The line modules 334 can include wavelength division multiplexing interfaces, short reach interfaces, and the like, and can connect to other line modules 334 on remote network elements, end clients, edge routers, and the like, e.g., forming connections on links in a network. From a logical perspective, the line modules 334 provide ingress and egress ports to the node 300, and each line module 334 can include one or more physical ports. The switch modules 336 are configured to switch channels, timeslots, tributary units, packets, etc. between the line modules 334. For example, the switch modules 336 can provide wavelength granularity (Layer 0 switching); OTN granularity, Ethernet granularity, and the like. Specifically, the switch modules 336 can include Time Division Multiplexed (TDM) (i.e., circuit switching) and/or packet switching engines. The switch modules 336 can include redundancy as well, such as 1:1, 1:N, etc.

Those of ordinary skill in the art will recognize the node 300 can include other components which are omitted for illustration purposes, and that the systems and methods described herein are contemplated for use with a plurality of different network elements with the node 300 presented as an example of a type of network element. For example, in another embodiment, the node 300 may not include the switch modules 336, but rather have the corresponding functionality in the line modules 334 (or some equivalent) in a distributed fashion. For the node 300, other architectures providing ingress, egress, and switching are also contemplated for the systems and methods described herein. In general, the systems and methods described herein contemplate use with any network element providing switching of channels, timeslots, tributary units, wavelengths, etc. and using the control plane. Furthermore, the node 300 is merely presented as one example of a distributed system for the systems and methods described herein.

As described herein, the node 300 is an example of a distributed system. In an embodiment, a distributed system includes a plurality of hardware modules, such as the modules 334, 336; and a plurality of services executed on one or more of the plurality of hardware modules, wherein a service of the plurality of services is configured to receive a provisioning request, stage the provisioning request to one or more additional services of the plurality of services, receive a staging response from the one or more additional services that provides additional provisioning for the one or more additional services based on the provisioning request, and provide an amended provisioning request for the service and the one or more additional services that includes the provisioning request and the additional provisioning.

Controller

Figure 7:
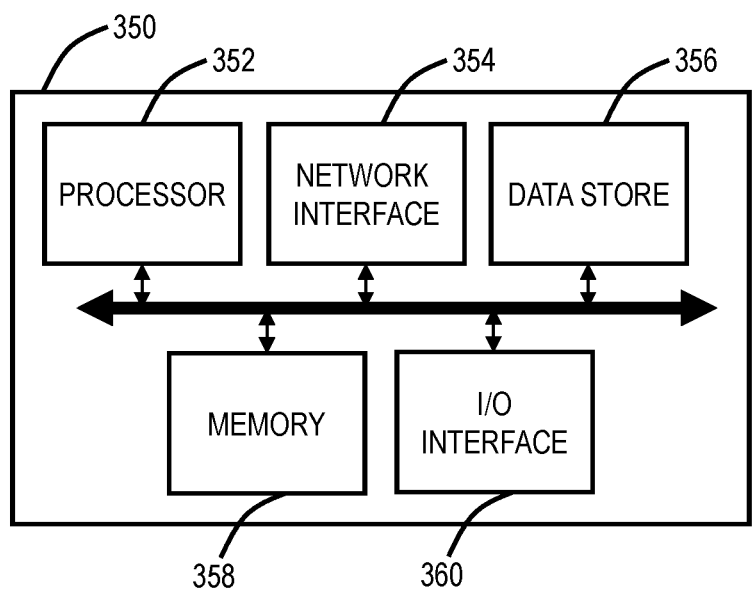

FIG. 7 is a block diagram of a processing device 350 for the node 300 or the like. The controller 350 can be part of the common equipment, such as common equipment 332 in the node 300, part of one of the modules 334, 336, a stand-alone device communicatively coupled to the node 300 via the DCN 340, etc. For example, the processing device 350 can be used to execute services in a distributed system. The processing device 350 can include a processor 352 which is a hardware device for executing software instructions. The processor 352 can be any custom made or commercially available processor, a central processing unit (CPU), an auxiliary processor among several processors associated with the processing device 350, a semiconductor-based microprocessor (in the form of a microchip or chip set), or generally any device for executing software instructions. When the processing device 350 is in operation, the processor 352 is configured to execute software stored within the memory, to communicate data to and from memory 358, and to generally control operations of the processing device 350 pursuant to the software instructions. The processing device 350 can also include a network interface 354, a data store 356, memory 358, an I/O interface 360, and the like, all of which are communicatively coupled to one another and to the processor 352.

The network interface 354 can be used to enable the processing device 350 to communicate on the DCN 340 or another network. The network interface 354 can include, for example, an Ethernet card (e.g., 10BaseT, Fast Ethernet, Gigabit Ethernet) or a wireless local area network (WLAN) card (e.g., 802.11). The network interface 354 can include address, control, and/or data connections to enable appropriate communications on the network. The data store 356 can be used to store data, such as control plane information, provisioning data, OAM&P data, etc. The data store 356 can include any of volatile memory elements (e.g., random access memory (RAM, such as DRAM, SRAM, SDRAM, and the like)), nonvolatile memory elements (e.g., ROM, hard drive, flash drive, CDROM, and the like), and combinations thereof. Moreover, the data store 356 can incorporate electronic, magnetic, optical, and/or other types of storage media. The memory 358 can include any of volatile memory elements (e.g., random access memory (RAM, such as DRAM, SRAM, SDRAM, etc.)), nonvolatile memory elements (e.g., ROM, hard drive, flash drive, CDROM, etc.), and combinations thereof. Moreover, the memory 358 may incorporate electronic, magnetic, optical, and/or other types of storage media. Note that the memory 358 can have a distributed architecture, where various components are situated remotely from one another but may be accessed by the processor 352. The I/O interface 360 includes components for the controller 350 to communicate with other devices.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method comprising:
   receiving, at a service in a distributed system, a provisioning request for the service, the service being one of a plurality of services that operate together in an architecture chosen from one of a Service-Oriented Architecture (SOA) and a Microservice Architecture (MSA) where each service is a self-contained unit of functionality, the plurality of services including one or more additional services;
   staging the provisioning request including forwarding, from the service, a staging request for the provisioning request to the one or more additional services in the distributed system;
   receiving, at the service, a staging response from the one or more additional services that provides additional provisioning including configuration changes for the one or more additional services based on analysis of the staging request performed by the one or more additional services, wherein the staging, including forwarding the staging request and receiving the staging response, is performed iteratively and recursively until all provisioning of the service and of the one or more additional services is obtained while maintaining domain specific knowledge of each of the one or more additional services with each respective service that owns the domain specific knowledge;
   generating, at the service, an amended provisioning request based on the iteration of the staging, and
   providing the amended provisioning request to the service and the one or more additional services that includes the provisioning request and the additional provisioning.

2. The method of claim 1, further comprising
   utilizing the amended provisioning request instead of the provisioning request such that the service is provisioned concurrently with the additional provisioning for the one or more additional services.

3. The method of claim 1, wherein the staging utilizes a plurality of stagers each associated with components of the distributed system, and wherein the staging includes proceeding for the components until there are no more stagers to be invoked or all invoked stagers report no additional data for the additional provisioning.

4. The method of claim 1, wherein the distributed system includes external components that are modeled by an external model and internal components that are modeled by an internal model, and wherein the external model is translated to an internal representation in the internal model before validation, and a validation code for the provisioning request is not replicated in each of the external model and the internal model.

5. The method of claim 1, wherein, responsive to an internal service making an internal change to an internal configuration that would also change an external model, the staging includes determining the change to the external model associated with the internal change such that validation is performed for both the internal service and the external model.

6. The method of claim 1, further comprising
   utilizing the amended provisioning request to form an entire transaction that is validated in advance of committing.

7. The method of claim 1, further comprising
   subsequent to the staging, identifying errors in the one or more additional services prior to committing the provisioning request; and
   preventing the provisioning request responsive to the errors.

8. The method of claim 1, wherein the distributed system is a network element having a plurality of modules.

9. A distributed system comprising:
   a plurality of hardware modules; and
   a plurality of services executed on one or more of the plurality of hardware modules, the plurality of services configured to operate together in an architecture chosen from one of a Service-Oriented Architecture (SOA) and a Microservice Architecture (MSA) where each service is a self-contained unit of functionality, the plurality of services include a service and one or more additional services, wherein the service is configured to
   receive a provisioning request,
   stage the provisioning request including forwarding a staging request for the provisioning request to the one or more additional services,
   receive a staging response from the one or more additional services that provides additional provisioning including configuration changes for the one or more additional services based on analysis of the staging request performed by the one or more additional services, wherein the staging, including forwarding the staging request and receiving the staging response, is performed iteratively and recursively until all provisioning of the service and of the one or more additional services is obtained while maintaining domain specific knowledge of each of the one or more additional services with each respective service that owns the domain specific knowledge, generate an amended provisioning request based on the iteration of the staging; and provide the amended provisioning request to the service and the one or more additional services that includes the provisioning request and the additional provisioning.

10. The distributed system of claim 9, wherein the service is further configured to utilize the amended provisioning request instead of the provisioning request such that the service is provisioned concurrently with the additional provisioning for the one or more additional services.

11. The distributed system of claim 9, wherein the provisioning request is staged via a plurality of stagers each associated with components of the distributed system, and wherein the provisioning request is staged via proceeding for the components until there are no more stagers to be invoked or all invoked stagers report no additional data for the additional provisioning.

12. The distributed system of claim 9, wherein the distributed system includes external components that are modeled by an external model and internal components that are modeled by an internal model, and wherein the external model is translated to an internal representation in the internal model before validation, and a validation code for the provisioning request is not replicated in each of the external model and the internal model.

13. The distributed system of claim 9, wherein, responsive to an internal service making an internal change to an internal configuration that would also change an external model, the staging includes determining the change to the external model associated with the internal change such that validation is performed for both the internal service and the external model.

14. The distributed system of claim 9, wherein the service is further configured to utilize the amended provisioning request to form an entire transaction that is validated in advance of committing.

15. The distributed system of claim 9, wherein the service is further configured to subsequent to the staging, identify errors in the one or more additional services prior to committing the provisioning request, and prevent the provisioning request responsive to the errors.

16. The distributed system of claim 9, wherein the distributed system is a network element.

17. A non-transitory computer-readable medium comprising instructions that, when executed, cause a processor to perform the steps of:

receiving a provisioning request for a service in a distributed system, the service being one of a plurality of services that operate together in an architecture chosen from one of a Service-Oriented Architecture (SOA) and a Microservice Architecture (MSA) where each service is a self-contained unit of functionality, the plurality of services including one or more additional services;

staging the provisioning request including forwarding a staging request for the provisioning request to the one or more additional services in the distributed system;

receiving a staging response from the one or more additional services that provides additional provisioning including configuration changes for the one or more additional services based on analysis of the staging request performed by the one or more additional services, wherein the staging, including forwarding the staging request and receiving the staging response, is performed iteratively and recursively until all provisioning of the service and of the one or more additional services is obtained while maintaining domain specific knowledge of each of the one or more additional services with each respective service that owns the domain specific knowledge;

generating an amended provisioning request based on the iteration of the staging; and providing the amended provisioning request to the service and the one or more additional services that includes the provisioning request and the additional provisioning.

18. The non-transitory computer-readable medium of claim 17, wherein the instructions that, when executed, further cause the processor to perform the step of utilizing the amended provisioning request instead of the provisioning request such that the service is provisioned concurrently with the additional provisioning for the one or more additional services.

* * * * *